United States Patent
McGrevy

[11] Patent Number: 6,099,292
[45] Date of Patent: Aug. 8, 2000

[54] HEATER BLOCK WITH UNITIZED REMOVABLE HEAT CONDUCTIVE MEMBER

[75] Inventor: Alan N. McGrevy, Chino, Calif.

[73] Assignee: Caco Pacific Corporation, Covina, Calif.

[21] Appl. No.: 08/956,187

[22] Filed: Oct. 22, 1997

[51] Int. Cl.⁷ .................................................. B29C 45/73
[52] U.S. Cl. .......................... 425/547; 425/572; 425/588
[58] Field of Search .................................... 425/572, 570, 425/547, 548, 588

[56] References Cited

U.S. PATENT DOCUMENTS

| | | |
|---|---|---|
| 2,875,312 | 2/1959 | Norton . |
| 2,987,300 | 6/1961 | Greene . |
| 3,314,573 | 4/1967 | Newton . |
| 3,318,481 | 5/1967 | Phillips et al. . |
| 3,531,023 | 9/1970 | Mercer . |
| 4,222,733 | 9/1980 | Gellert et al. . |
| 4,256,584 | 3/1981 | Lord et al. . |
| 4,280,908 | 7/1981 | Lord et al. . |
| 4,395,222 | 7/1983 | Gaiser et al. ............................ 425/588 |
| 4,417,675 | 11/1983 | Abt et al. . |
| 4,449,915 | 5/1984 | Van Den Brink . |
| 4,460,819 | 7/1984 | Eugster .................................... 219/302 |
| 4,465,922 | 8/1984 | Kolibas . |
| 4,472,778 | 9/1984 | Ogawa . |
| 4,493,972 | 1/1985 | Steinel et al. . |
| 4,530,654 | 7/1985 | Rose . |
| 4,609,138 | 9/1986 | Harrison . |
| 4,702,689 | 10/1987 | Schmidt et al. . |
| 4,705,473 | 11/1987 | Schmidt . |
| 4,712,995 | 12/1987 | Basnett . |
| 4,729,733 | 3/1988 | Schmidt . |
| 4,740,151 | 4/1988 | Schmidt et al. . |
| 4,747,770 | 5/1988 | Schmidt . |
| 4,755,131 | 7/1988 | Schmidt . |
| 4,768,945 | 9/1988 | Schmidt et al. . |
| 4,771,534 | 9/1988 | Gellert et al. . |
| 4,793,795 | 12/1988 | Schmidt et al. . |
| 4,810,184 | 3/1989 | Gellert et al. . |
| 4,818,217 | 4/1989 | Schmidt et al. . |
| 4,917,594 | 4/1990 | Gellert et al. . |
| 4,981,431 | 1/1991 | Schmidt . |
| 5,000,675 | 3/1991 | Gellert et al. . |
| 5,002,480 | 3/1991 | Gellert et al. . |
| 5,004,416 | 4/1991 | Van Den Brink . |
| 5,007,821 | 4/1991 | Schmidt . |
| 5,022,846 | 6/1991 | Schmidt . |
| 5,028,227 | 7/1991 | Gellert et al. . |
| 5,030,084 | 7/1991 | Gellert et al. . |
| 5,104,307 | 4/1992 | Van Den Brink . |
| 5,113,576 | 5/1992 | Van Boekel et al. . |
| 5,142,126 | 8/1992 | Teng . |
| 5,226,596 | 7/1993 | Okamura . |
| 5,227,181 | 7/1993 | Knudsen . |
| 5,539,857 | 7/1996 | McGrevy . |

*Primary Examiner*—Tim Heitbrink
*Attorney, Agent, or Firm*—Sheldon & Mak

[57] ABSTRACT

A unitized heat conductive assembly 32 formed of a one piece heat conductive conduit 40 which permits shaping the heat conductive assembly as a continuous unit. The heat conductive assembly 32 is press fit into the heater block 12 configured so that it provides a predetermined flow path 14 for the flowable molten plastic materials to be delivered to the injector nozzles. There is provided a heat flow path 28 that follows the flow path 14. The heat conductive carrying conduit 40 is formed with an opening 42. The conductive conduit 40 is formed from a tubular piece of conductive metal such as copper or brass by a swaging process which forms a tubular structure 40 in a continuous length. The outer contour of the tubular structure 40 can be round or oral and the preferred shape is either square or rectangular. The cross-section the heat conductive conduit 40 has a dimension W transverse the cross-section and a narrower dimension N at the bottom of the cross-section so that it is adapted to be press fit into the channel 30. A channel 30 is provided have a dimension W transverse the channel mouth 52 and a narrow dimension $N^1$ at the bottom. The heat conductive conduit 40 forms a press fit within the channel 30. The continuous length of heat conductive conduit 40 is shaped to follow the flow path 14 of the molten plastic material flowing through the manifold 10.

9 Claims, 3 Drawing Sheets

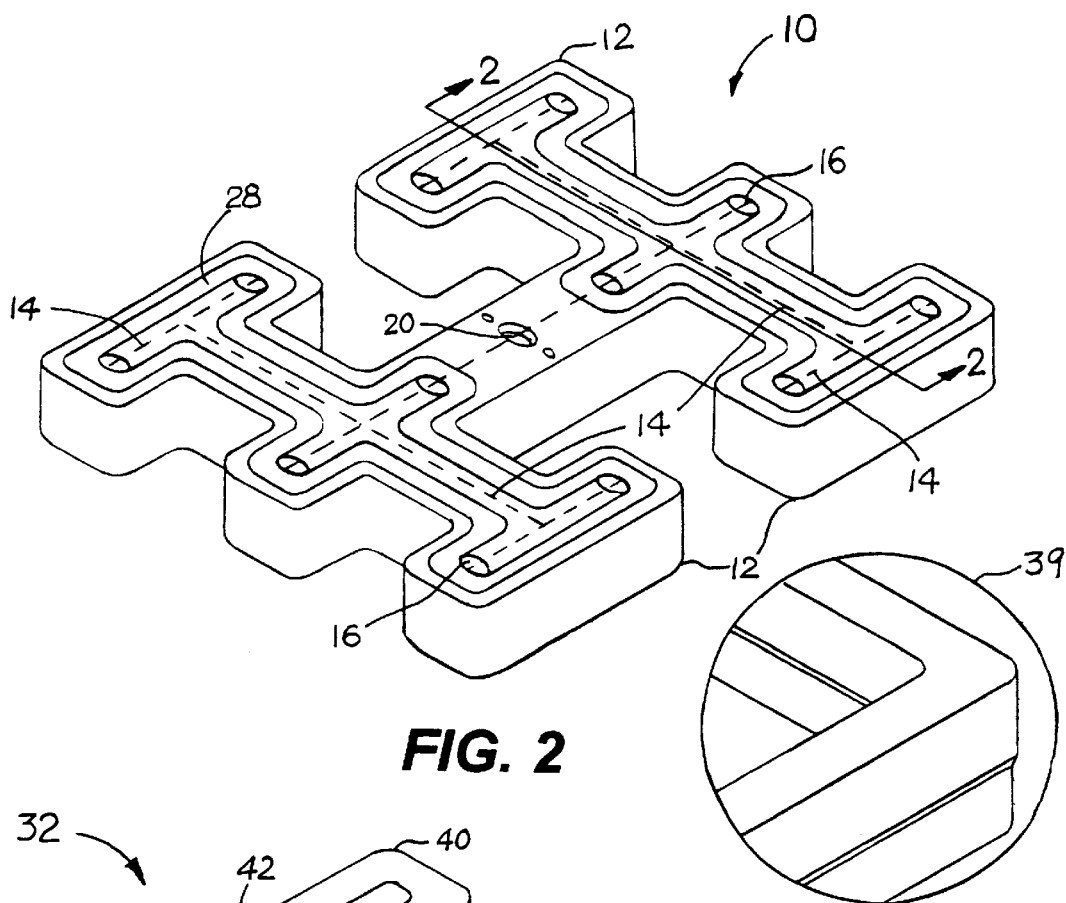
FIG. 2
FIG. 3A
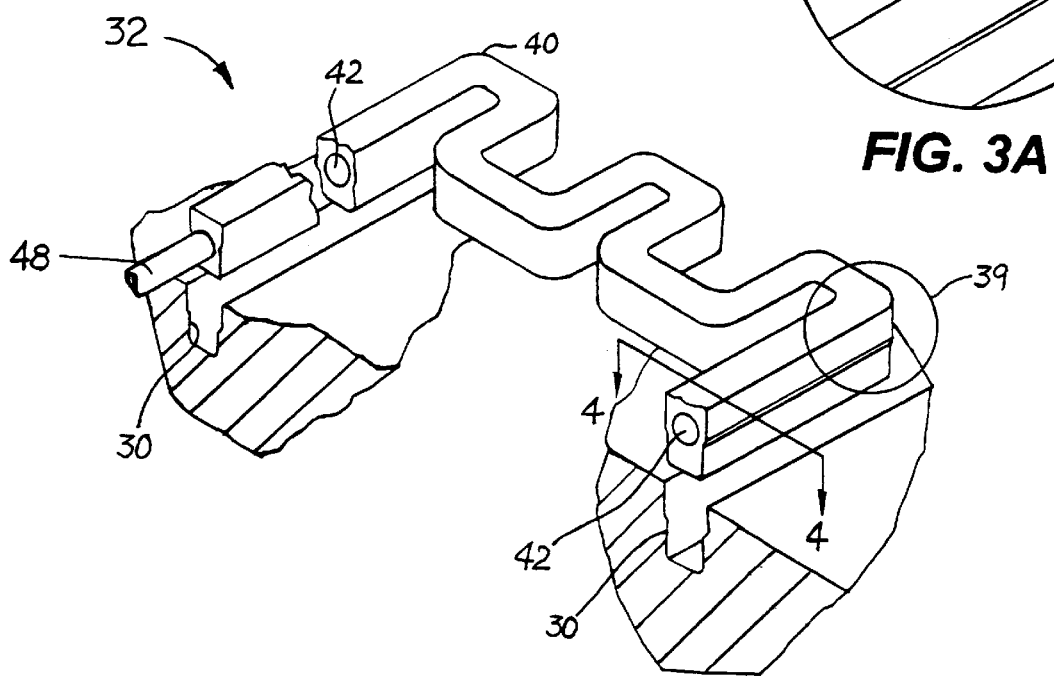
FIG. 3

6,099,292

HEATER BLOCK WITH UNITIZED REMOVABLE HEAT CONDUCTIVE MEMBER

BACKGROUND OF THE INVENTION

1. Technical Field

This invention relates to heating systems for injection molds and more particularly to the system and methods of forming the heating assemblies that supply heat to the plastic materials used to mold components which are fed through complex manifold delivery paths to the nozzles disposed in the mold.

2. Discussion

The condition of the molding material that is delivered to a mold cavity is critical to the quality of the component that comes out of the mold. The reference to the condition of a fluid means at least the desired temperature of the fluid to obtain optimum molding quality for the components. Injection molds typically mold large numbers of components with each injected feed cycle to provide high capacity production of the molded parts. The molding material typically is a molten plastic material which is fed from a primary supply to a series of distributor manifolds which in turn feed an array of injection nozzles that inject the plastic into the mold cavity.

It is essential that the molding material injected into the molds be at the proper temperature notwithstanding the fact that it travels over a serpentine path from the primary supply to the feed manifolds and into the mold cavity. Temperature differences within the molten plastic delivered to different cavities can result in different fill rates and hence different weights for the components or it may cause the molten plastic to overheat and degrade. Another problem is that it may be at too low a temperature causing similar problems or result in the use of excessive pressures.

The use of a series of manifolds to supply large number of mold cavities simultaneously is a standard production requirement. It therefore becomes necessary for the injection mold heat assembly to be designed to avoid the aforementioned failure conditions that could result when the fluid is not properly heated. The design of such heating systems desirably should be more than just meet heating requirements. The building of the system should also desirably be low in cost which translates into simple construction techniques that can be accomplished in very short periods of time and are not overly complicated. Another requirement for these heating systems is that replacement of burned out heaters be easily maintained and quickly reassembled without requiring inordinate down time of the injection molding machines.

Previously known systems, while effective in terms of the temperature control, were unduly expensive, and due to the complexity required long periods of time to assemble the systems as well as replacement and to reassemble. The conventional approach in these prior heating systems is to enclose or contain a heating element in a heat conductive conduit that is then secured in the heating block of the distribution manifold. The heating block is adapted to provide the essential thermal control for the multiple fluid delivery stations embodied in the manifold but simultaneously feed multiple cavity molds.

It has been known to enclose the heating element in a pair of separable abutting members that form a hole when the upper and lower portions of the abutting members are combined to carry the heating element. Referring to FIG. 1 there is shown a heat conductive conduit that has been formed from separable abutting members described in U.S. Pat. No. 5,539,857 assigned to the same assignee as the instant invention. Prior art FIG. 1 illustrates the serpentine heat conductive conduits that are constructed in the heating block in order that it trace the fluid delivery path from the molten plastic supply to the injection molding stations. Assembly of the abutting parts X and Y and then enclosing the heater units which can then be fixed into a serpentine heating channel required that they be assembled in multiple sections. A continuous length of abutting members X and Y could not easily be bent once assembled with the heating element or properly shaped to fit into the serpentine heating paths in the heating block without first forming individual sections A through J as identified in FIG. 1 which are then pieced together. The largest conductive conduit section was generally a "U" shaped or loop configuration. This separable abutting type construction was costly, time consuming but at the time it was an improvement to the then existing techniques.

What is required is a low cost, simple to assemble and replace heating assembly, that can be assembled in a very short period of time and is effective in providing the needed thermal control for the flowable molten plastic that forms the molded components.

SUMMARY OF THE INVENTION

The invention provides a heating system for injection molding equipment and a method of fabricating the heating system to supply heat to the molten plastic that forms the molded components. There is provided a heating block equipped with an open channel for concurrently delivering the fluid to multiple injection nozzles over a multidirectional flow path through the heating block and providing a continuous conductive conduit for carrying a continuous strip heating element. The open channel is cut into the heater block and is adapted to receive and securely hold the conductive conduit carrying the heating element along a path corresponding to a predetermined serpentine flow path to uniformly heat the molten plastic to a predetermined temperature until it reaches the injection nozzle. The open channel is configured with its inner wall surface contoured to securely hold the conductive conduit when it is pressed into the channel. The dimensions of the channel are such that it is nominally wider at the upper portion to readily accept the tapered bottom portion of the conduit and it is flared at the bottom to allow the bottom of the conduit to swage out as it is pressed into the channel.

The method of forming the heating block comprises of steps of providing a predetermined serpentine flow path through the heating block to concurrently inject flowable plastic materials into the mold cavities and cutting an open channel into the heating block that closely follows the serpentine flow path to receive the heating assembly. The walls of the open channel are configured to provide a gripping force against the heating assembly and is adapted to be pressed into the open channel. The steps of forming the heating assembly includes forming a continuous strip of heat conductive conduit such as copper by swaging a tubular heat conductive conduit, that can be of a circular or rectangular cross-section, into a rectangular shaped conductive conduit adapted to receive a heat generating element therein. The heat conductive assembly is completed by inserting a continuous length of heating element into the heat conductive conduit opening and shaping the continuous length of the heat conductive assembly to coincide with the predetermined serpentine heat flow path and pressing the continuous strip into the heating block for providing uniform heat to the flowable molten material.

BRIEF DESCRIPTION OF THE DRAWINGS

These and other features, aspects and advantages of the present invention will become better understood from the following description, appended claims and the accompanying drawings where:

FIG. 1A is enlarged perspective of section A showing the assembly of the separable abutting parts.

FIG. 2 is a top perspective view of a twelve station distribution manifold of this invention for an injection mold, FIG. 3 is a perspective of the conductive, heat element carrying conduit with the heating element deposited in the coextensive opening and the channel into which it pressed fit;

FIG. 3A is an enlarged perspective of section 39 showing the tapered contour of the conduit and the open channel.

DETAILED DESCRIPTION

Figure 1:
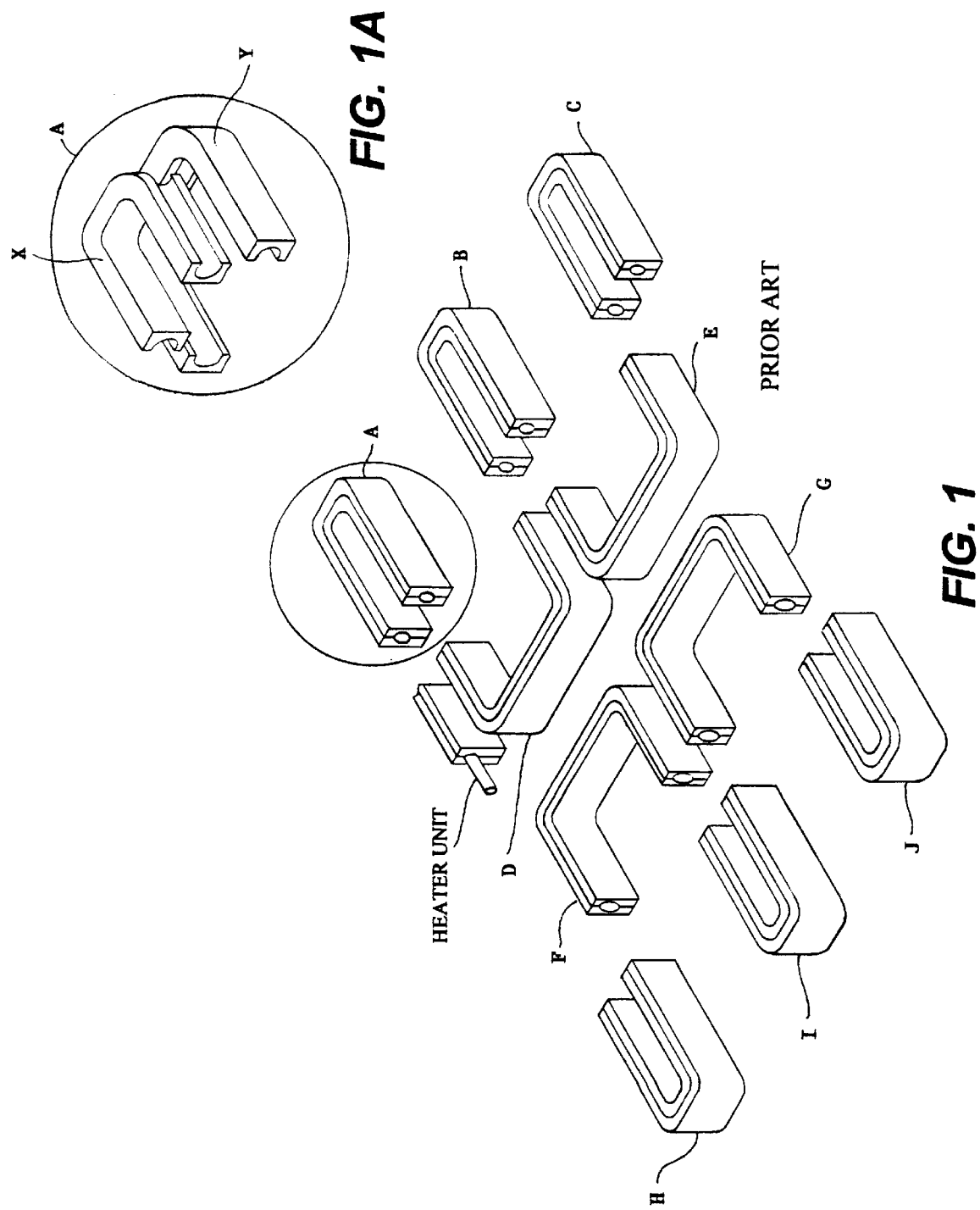
FIG. 1 is a perspective view of the sectional build up of an encased heat transfer unit for a distribution manifold equipped with a prior art-heat-element carrying conduit where the conduit is formed with abutting members.

Referring to FIG. 2 there is shown a hot runner manifold heater block identified generally with the reference numeral 10 which comprises a heater block 12 configured so that it provides a predetermined flow path 14, shown in dotted outline, for the flowable molten materials to be delivered to the injector nozzles (not shown). The heater block 12 is formed with a plurality of feed stations 16 that are located at the gate of each mold cavity (not shown). It will be appreciated that flow path 14 of the molten material is arranged to provide the optimally balanced direct route through the manifold 10 from a primary feed supply 20 of molten plastic to each feed station 16. In order to optimize the heat input to the molten material as it courses through the flow path 14 and through the manifold 10 there is provided a predetermined serpentine heat flow path 28 which will contain the heating assembly 32.

Figure 4:
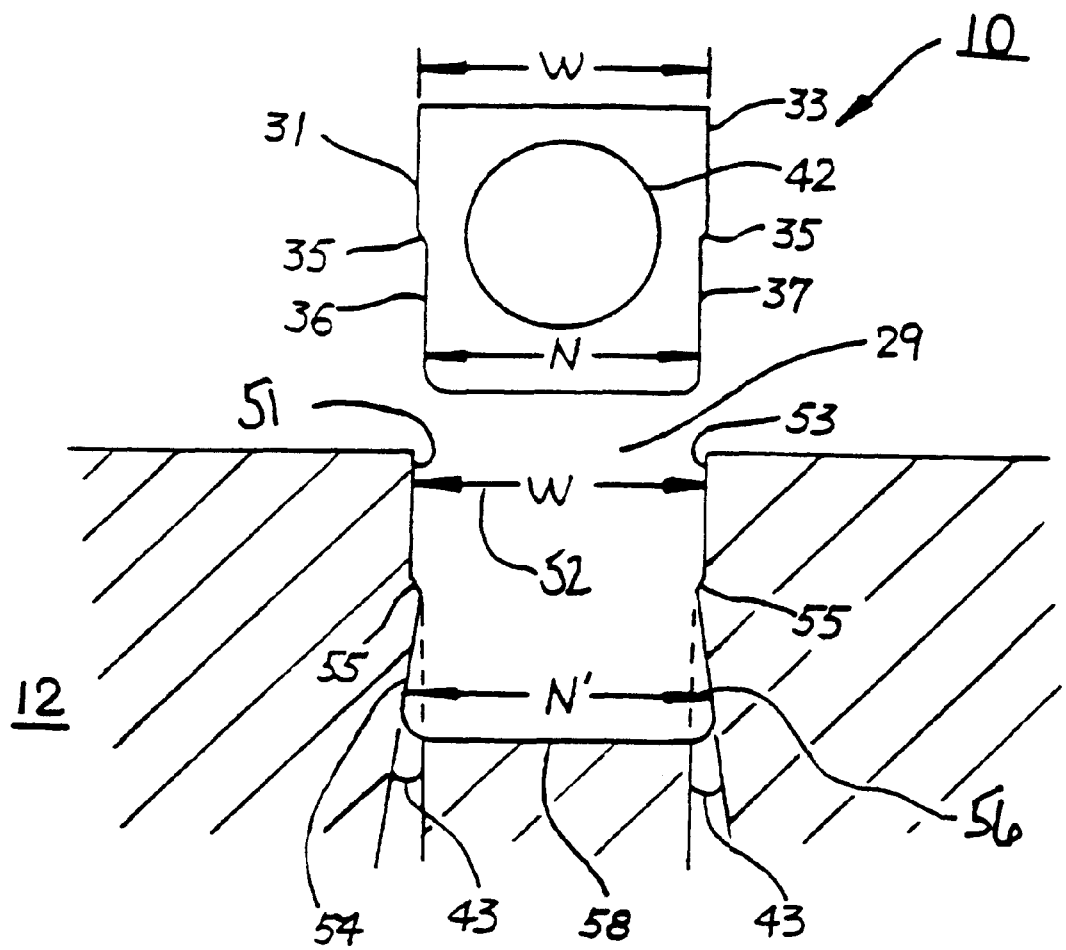
FIG. 4 is a cross-section of the heating flow path channel taking along 3—3 of FIG. 3 illustrating the manner in which the carrier conduit is fixedly held in the channel.

The heat flow path 28 is formed by cutting an open channel 30, shown in FIGS. 3 and 4 that is conductively aligned with the molten plastic flow path 14. The channel 30 follows the predetermined flow path 14 as closely as possible in order to conductively transfer heat from the heating assembly identified by the general reference numeral 32. As shown in the cross-sections of FIGS. 3 and 4 the heat flow path 28 comprises an open cutout channel 30 having internal upper side walls 51 and 53 and internal lower portion side walls 54 and 56 and a floor 58. The cross-section of the channel 30 is generally rectangular and adapted to receive the heating assembly 32 which is pressed into the channel 30. Further details of the construction of the channel 30 and the heating assembly 32 will be discussed in greater detail hereinafter.

Referring to FIG. 3 there is shown in perspective the right side of the right half of the manifold 10 of FIG. 2 including the conductive carrying conduit 40 formed with an opening 42 that runs the extent of the conductive carrying conduit 40. An important aspect of this conductive carrying conduit is the manner in which continuous lengths are produced with the longitudinal extending opening therethrough 42. The conductive conduit 40 is formed from a round or rectangularly cross-sectioned tube made of heat conductive metal, preferably copper or brass, and it is put through a swaging process involving cold forming or forcing or pulling the stock over a die and then over a mandril which forms a continuous length of a heat conductive structure 40.

It will be appreciated that the outer-contour of the heat conductive conduit 40 may be circular or oval shaped but it is preferred that it be of a rectangular or square shape for the ease of press fitting the rectangular shaped conduit into a correspondingly shaped cutout or channel 30 in the heating block 12 thereby maximizing the heat transfer. As discussed earlier the heat conductive assembly 32 is press fit into the channel 30 and the rectangular or square cross-section is preferred. Within the continuous length of the conduit 40 and in order to complete the heating assembly there is inserted an electrical heating element 48 into the opening 42. As shown in FIG. 4 the cross-sectional contour of the conductive conduit has a width span "W" between the upper side walls 31 and 33 which become narrow at the bottom portions forming a back taper having a narrow dimension "N" between the side walls 36 and 37. With the back taper or narrowing N of the bottom wall portions 36 and 37 from the width W there is formed a pair abutments 35 which extend longitudinally the full length of the heat conductive conduit 40.

The channel 30 is formed with corresponding dimensions having a width W across the mouth 52 of the channel 30 and it has a narrow dimension at the bottom. The side walls 54 and 56 are formed with flared tapers 43 in the range of 2° to 7° from the vertical.

The heat conductive assembly 32 with the swaged heat conductive conduit 40 carrying the electrical heating element 48 is next shaped to conform to the predetermined heater unit flow path 28. It will be appreciated that the heater unit flow path 28 is formed in a manner so as to very closely approximate the flow path of the 14 of the molten plastic that is fed to each of the mold injection stations 16 in order to optimize the heat transfer and the efficiency of maintaining the molten plastic at the proper temperature.

Referring again to FIG. 4 there is illustrated one form of cross sectional contour taken along 4—4 of FIG. 3. The heating assembly 32 has its upper side walls 31 and 33 contoured so that the span of the lower portion has a width N that will permit it being inserted into the top 29 of the channel 30. As described earlier the upper wall portions 31 and 33 have a width W and the lower wall portions 36 and 37 have a narrower N dimension in which is designed to ease the insertion of the heat conductive conduit 32 into the channel 30. The narrowing of the sidewalls from dimension W to dimension N will generate an abutment 35 in each of the side walls which abutment extends longitudinally the full length of the conductive conduit.

Turning now to the channel 30 as described earlier it similarly has a cross-section that corresponds to the cross-sectional configuration of the heat conductive conduit 32. The upper inside wall portions 51 and 53 have a span between them of W across the channel mount 52 and the lower wall portions 54 and 56 are the narrower span $N^1$ which conforms to the general contour of the heat conductive conduit 32. The narrowing from a span W to a span $N^1$ produces an offset or tapered portion 55 which extends the full longitudinal extent of the channel 30. The heat conductive assembly 32 is completed by inserting the heating element 48 into the opening 42 exposing its extremities from each end of the conduit in order to make the appropriate connections to a power supply (not shown) once the assembly is in place in the heating block. With the heating element 48 in place in the opening 42 the N dimension of the heat conductive conduit 32 is inserted into the W span end of the heat conduit 32 between the walls 51 and 53 and it is pressed into the channel causing the copper conduit to fill the flared out taper $N^1$ until the lower portion N of the conduit 32 engages the floor 58 of the channel 30. The narrow span N with the wall portions 36 and 37 will engage the lower wall portions 54 and 56 of the channel 30 filling the $N^1$ dimension.

It will be understood that the W dimension of the upper portion as well as the lower portion will be slightly larger then the corresponding dimensions of the channel 30 thereby forming a tight fitting wedged assembly. By pressing the heat conductive conduit into the channel 30 the copper or brass metal conforms to the much harder stainless steel metal of the inside wall contours particularly in the area of the tapered portion 55 of the conduit in the channel respectively.

In practice the manifold 10 is designed to supply flowable molten plastic to a plurality of injection mold stations 16. In the instant example there are two sets of predetermined serpentine flow paths 28 each comprising six injection mold stations 16 making for a total of twelve. The heat molten plastic is supplied to the manifold 10 by feeding molten plastic into a central feed station 20 which then travels over the dotted line path 14 to the various stations. The heat conductive conduit 32 is formed into two sections one for each half of the heating block serving each of the six stations. The overall height of the heat conductive conduit 32 that is made up of the walls 31/33 and 36/37, a total of 0.450 inches with the upper W portion above the abutment 35 is 0.225 inches and lower narrower portion is 0.175 inches. The diameter of opening 42 that accepts the heater element is in the range of 0.187 inches to 0.320 inches preferably 0.312 inches. The value for W across the opening of the channel 30 is 0.375 inches and the narrower N floor portion has a span of 0.361 inches. The conduit when pressed into a channel will encounter the abutments 35 at the upper portion so this becomes wedged or press fit into the channel 30. With the $N^1$ of the channel having slight 2° to 7° flared taper promotes the copper conduit to adapt to the walls of the channel which serve as a wedge and helps retain the heater in place. As the conduit 40 heats up the flared tapers 43 acts like a reverse clamp area which pulls the conduit 40 onto the floor 58.

If the heater element 48 burns out the combined heater 48 and conduit 40 are removed from the channel 30 and a new replacement assembly 32 is pressed fit into the channel.

Although the present invention has been described in considerable detail with reference to certain preferred versions thereof, other versions are possible. Therefore, the spirit and scope of the appended claims should not be limited to the description or the size dimensions of the preferred versions contained herein.

What is claimed is:

1. A manifold structure for delivering molten plastic concurrently to multiple molding stations, the manifold structure comprising:

a serpentine fluid delivery path for delivering molten plastic to said molding stations;

a heat conductive path generally following the serpentine fluid delivery path;

a unitary heat conductive conduit having outer side walls and formed with a longitudinal opening therein that extends the length of the heat conductive path;

a heating element in the opening; and wherein the heat conductive conduit has a contour that conforms to the serpentine fluid path by fixedly pressing the heat conductive conduit into the heat conductive path.

2. A distribution manifold structure for delivering molten plastic concurrently to multiple mold stations comprising:

a fluid delivering manifold having a serpentine fluid path for delivering molten plastic concurrently to the multiple mold stations;

a continuous heat conductive path that is in heat conductive relationship to and which generally follows the serpentine fluid path;

a unitary heat conductive conduit having side walls and a longitudinally extending opening therein to receive a heat generating element contiguous to the serpentine fluid path for conductively transferring heat to said serpentine fluid path along its length; and the heat conductive conduit and the corresponding heat conducting path having complementary cross-sections for fixedly pressing the heat conductive conduit into the heat conductive path.

3. The structure as claimed in claim 2 wherein the heat conductive conduit is made of copper or brass.

4. The structure as claimed in 2 wherein the heat conductive conduit is formed by swaging a length of tubular stock into a conduit with the opening along its length and having a continuous length corresponding to the length of the heat conductive path.

5. The structure as claimed in claim 2 wherein the transverse dimension of the cross-section of the heat conductive conduit is wider at the top of the conduit than at the bottom of the conduit.

6. The structure as claimed in claim 2 including a heat generating element in the opening, the heat generating element being a resistive wire within an electrical insulator.

7. The structure as claimed in claim 5 wherein the heat conductive conduit has a flared-out taper in the range of 2 to 7 degrees from the vertical dimension.

8. The structure as claimed in claim 2 wherein the cross-section of heat conductive conduit is stepped to be press fitted into the heat conductive path.

9. A distribution manifold structure for delivering molten plastic concurrently to multiple injection mold stations, the manifold structure comprising:

a fluid delivering manifold having a serpentine fluid path for delivering molten plastic concurrently to the multiple mold stations;

a continuous heat conductive path that is in heat conductive relationship to and which correspond to the serpentine fluid path;

a unitary heat conductive conduit press-fitted into the heat conductive path, the heat conductive conduit having a longitudinally extending opening therein; and a heat generating element in the longitudinally extending opening for conductively transferring heat to the serpentine fluid path.

* * * * *